United States Patent
Macchioni et al.

(12) 
(10) Patent No.: US 6,488,735 B1
(45) Date of Patent: Dec. 3, 2002

(54) FERTILIZER COMPOUND HAVING A GLASS MATRIX

(76) Inventors: Giuseppe Macchioni, Edif. Cerarte, Avenida 27 de Febrero, 359 Santo Domingo (DO); Giovanni Marazzi, Via Moscati, 31, 41049 Sassuolo (IT); Franco Ambri, Via Montegibbio, 33/a, 41049 Sassuolo (IT)

(*) Notice: Subject to any disclaimer, the term of this patent is extended or adjusted under 35 U.S.C. 154(b) by 0 days.

(21) Appl. No.: 09/667,917

(22) Filed: Sep. 22, 2000

(30) Foreign Application Priority Data

Sep. 30, 1999 (IT) ........................... MO99A0207

(51) Int. Cl.⁷ ............... C05A 3/00; C05A 3/10; C05D 9/02
(52) U.S. Cl. ............ 71/32; 71/44; 71/47; 71/51; 71/52; 71/53; 71/63
(58) Field of Search ................. 71/32, 63, 44, 71/47, 51, 52, 53

(56) References Cited

U.S. PATENT DOCUMENTS

| | | | | |
|---|---|---|---|---|
| 3,762,909 A | * | 10/1973 | Davie et al. .................. | 71/1 |
| 3,897,236 A | * | 7/1975 | Roberts ........................ | 71/1 |
| 3,930,833 A | | 1/1976 | Roberts ........................ | 71/64 |
| 4,123,248 A | * | 10/1978 | Drake .......................... | 71/4 |
| 4,334,908 A | | 6/1982 | Duchateau et al. ........... | 71/52 |
| 4,867,779 A | * | 9/1989 | Meunier et al. .............. | 71/62 |

FOREIGN PATENT DOCUMENTS

| | | | |
|---|---|---|---|
| DE | 11 64 434 | | 2/1956 |
| DE | 12 32 993 | | 2/1956 |
| EP | 0 179 588 | | 4/1986 |
| FR | 2 591 423 | | 6/1987 |
| JP | 06122584 | * | 5/1994 |
| JP | 06321575 | * | 11/1994 |
| SU | 1087498 | * | 4/1984 |
| WO | 8302939 | * | 9/1983 |

OTHER PUBLICATIONS

Chemical Abstracts, vol. 129, No. 9, Aug. 31, 1998 Columbus, Ohio, US; abstract No. 108604w, I. Waclawska Et Al.: "Glasses of controlled dissolution rate as ecologically–safe fertilizers for agriculture" p. 599; XP000786250 *abstract* & Fundam. Glass Sci. Technol., (Conf.) 1997, 743–747.

Chemical Abstracts, vol. 119, No. 5, Aug. 2, 1993 Columbus, Ohio, US; abstract No. 48588a, I.KH. Isaev Et Al.: "Granulated prolonged–action fertilizer based on phosphate glass" p. 865; XP000408421 *abstract* & SU 1 742 276 A Jun. 23, 1992.

* cited by examiner

*Primary Examiner*—Chhaya D. Sayala
(74) *Attorney, Agent, or Firm*—Wolf, Greenfield & Sacks, P.C.

(57) ABSTRACT

A fertilizer compound having a glass matrix comprises, among the forming oxides of the glass matrix, a phosphorus pentoxide ($P_2O_5$) as partial and/or full replacement of silica ($SiO_2$); among the modifier oxides of the said glass matrix, a potassium oxide ($K_2O$) as partial and/or full replacement of sodium oxide ($Na_2O$); and one or more trace elements.

19 Claims, No Drawings

FERTILIZER COMPOUND HAVING A GLASS MATRIX

CROSS-REFERENCE TO RELATED APPLICATIONS

This application claims priority to Italian Application Ser. No. M099A000207 filed Sep. 30, 1999, the disclosure of which is incorporated herein by reference.

BACKGROUND OF THE INVENTION

The present invention relates to a fertilizer compound having a glass matrix.

It is known that fertilizer elements, i.e. the elements that provide the nutrients required for the growth of crops, are divided into three categories: primary elements, i.e. nitrogen (N), phosphorus (P) and potassium (K); secondary elements, i.e. calcium (Ca), magnesium (Mg), sodium (Na) and sulfur (S); and trace elements, i.e. boron (B), cobalt (Co), copper (Cu), iron (Fe), manganese (Mn), molybdenum (Mo) and zinc (Zn).

This division is based on the amount of element absorbed by the crops, not on their function, since all these elements are equally indispensable for the balanced growth of plants.

The above-cited elements are the ones that currently can be listed on the label as components of a formula according to the standards prescribed by applicable national and European Union statutory provisions.

Fertilizer elements have a decisive effect on the growth of crops both when they are insufficiently available and when they are in excess, causing on the one hand poor nutrition of the crops and on the other hand a toxic condition.

It is therefore necessary to ensure, for each crop, the presence and availability over time of these elements, so that the soil contains them in quantities which are adequate but contained within very precise and controllable limits, depending on the requirements and the development stage of the crop.

It is also noted that a same soil is alternately used, for periods of varying duration, for different crops which absorb different amounts of nutrient both in qualitative and in quantitative terms.

It is therefore indispensable to periodically balance the resources of the soil in relation to the changes in requirements.

Moreover, the controlled presence of fertilizing elements in agricultural soils affects not only the life and growth of plants but also decisively controls the commercial characteristics of foodstuffs designed for human consumption.

In order to compensate for the nutritional imbalances that are widespread in most soils adapted for products for human use it is necessary to supply agricultural soils not only with the primary elements (N, P and K) and the secondary ones (Ca, Mg, Na, S) but also with the trace elements (B. Co, Cu, Fe, Mn, Mo, Zn).

Selective administration of the trace elements must occur at programmed times and in preset amounts according to the type of crop, the stage of its growth and the characteristics of the cultivated soil.

Several methods are known for introducing fertilizers in general, and particularly trace elements, in the soil.

The foremost consists in adding to fertilizers based on nitrogen, phosphorus and potassium (NPK) small amounts of the particular trace elements deemed to be lacking in the soil to be cultivated.

These trace elements are introduced in the form of inorganic salts (sulfates, oxides or others) or in the form of metal-organic complexes known as chelates, which are synthesis products highly water-soluble and hence highly assimilated by the plant.

This method is not devoid of drawbacks, the foremost being the immediate availability of the trace elements for absorption by the plants in excessive amounts and over periods which are not correlated to their growth cycle and the considerable leakage of nutrients into the environment due to rainwater and irrigation water.

In order to obviate these drawbacks, controlled-solubility fertilizers have been introduced which are obtained by encapsulating granules of the fertilizing formulas with low-solubility organic products.

However, even this system suffer drawbacks: since the trace elements are introduced, in this case also, in the form of inorganic salts and/or chelates which are water-soluble, they are rapidly assimilated by the root system of the plants and/or dispersed in the soil once the outer coating has degraded.

For the same reason, these fertilizers are useful only if rapid nutrient action is required; if instead one wishes to ensure their presence in the soil for long periods, it is necessary to resort to multiple successive low-dosage applications of the same products, entailing a consequent increase in field operating costs.

Finally, it is necessary to note the high intrinsic cost of these fertilizers, since each chelate normally adds a single trace element, so that if it is necessary to administer multiple elements it is also necessary to use several chelates.

The problems linked to the use of inorganic salts and/or chelates of trace elements have been partially obviated by introducing FTE (Fritted Trace Element) fertilizers.

These products have a predominantly amorphous structure and are constituted by a glass matrix which acts as substrate and in which one or more trace elements are dispersed and bonded.

The solubilization of the product, and therefore the release of the trace elements contained therein, depend on the chemical composition of the glass matrix in relation to the conditions of the soil in which the fertilizer is dispersed (humidity, pH).

It is known that the water-solubility of glass is poor; accordingly, FTEs are products which ensure very slow selective and controlled release of one or more trace elements over time, so as to potentially affect the entire life span of perennial plants or a considerable series of successive crops (up to 10 years).

Known FTEs suffer the drawback that they cannot be used as short-term fertilizers with immediate assimilation due to their poor solubility and consequent slow release action.

The aim of the present invention is to eliminate the above-noted drawbacks of conventional types of fertilizer, by devising a fertilizer compound having a glass matrix which allows to achieve selective release of nutrients whose action is immediate from the beginning of the application and is programmable, controllable and extendible over time, allows to add to the soil, in precise times and amounts, the chemical elements that are necessary for the growth of the plant being cultivated, in relation both to the state of its growth and to the physical-chemical conditions of the soil, and has a low cost.

SUMMARY OF THE INVENTION

These and other objects which will become better apparent hereinafter are achieved according to the present invention by a fertilizer compound having a glass matrix which is characterized in that it comprises, among the forming oxides of said glass matrix, a phosphorus pentoxide ($P_2O_5$) as partial and/or full replacement of silica ($SiO_2$); among the modifier oxides is of said glass matrix, a potassium oxide ($K_2O$) as partial and/or full replacement of sodium oxide ($Na_2O$); and one or more trace elements.

DESCRIPTION OF THE PREFERRED EMBODIMENTS

Advantageously, in addition to the phosphorus pentoxide and the silica, the forming oxides comprise alumina ($Al_2O_3$), titanium dioxide ($TiO_2$) and zirconium dioxide ($ZrO_2$).

Preferably, in addition to the potassium oxide and sodium oxide, the modifier oxides comprise oxides of calcium (CaO), magnesium (MgO), barium (BaO) and lithium ($Li_2O$).

As regards trace elements or micro-elements, they are preferably constituted by boron (B), cobalt (Co), copper (Cu), iron (Fe), manganese (Mn), molybdenum (Mo) and zinc (Zn) and are introduced in the following preferred percentages:

$B_2O_3$: 9 to 18%; CoO: 0.5 to 0.1%; CuO: 4 to 0.1%; $Fe_2O_3$: 11 to 2%; MnO: 9 to 1%; MoO: 0.5 to 0.1%; and ZnO: 8 to 2%.

The stability of the glass matrix of the compound according to the invention depends on a series of chemical and technological parameters: in the specific case, in particular, the key role is played by the presence of the phosphorus pentoxide ($P_2O_5$) as replacement of silica in the role of glassy network forming oxide, allowing to control the solubility characteristics in the various solvents at various pH levels.

Moreover, the fact should not be ignored that phosphorus is an element which is essential for the life of plants and is widely present in fertilizer formulas; therefore in this case there is also a further introduction of nutrient, increasing the agronomic value of the product.

The replacement of sodium with potassium in the glass matrix also allows better control of the solubility ranges (in water and other reagents) and further increases the nutritional value of the product, since the addition of potassium also is fundamental for the life of plants.

The forming oxides are present in the following preferred percentages:

$SiO_2$: 0.1 to 26%; $Al_2O_3$: 0.1 to 9%; $TiO_2$: 0.1 to 3%; and $ZrO_2$: 0.1 to 3.5%.

The modifier oxides are present in the following preferred percentages:

$Na_2O$: 8 to 1%; $Li_2O$: 0.1 to 3%; CaO: 22 to 6%; MgO: 3 to 0.1%; BaO: 2.7 to 0.1%.

Advantageously, $P_2O_5$ is present in amounts between 9 and 22%, while $K_2O$ is present in amounts between 12.8 and 3%.

Furthermore, the following conditions should be preferably met:

($B_2O_3$ +$F_2O_3$ +MnO +ZnO +CuO +MoO +CoO) between 45 and 19%;

(CaO +MgO +BaO) between 29 and 6%;

($Na_2O$ +$K_2O$ +$Li_2O$) between 19 and 7%;

($TiO_2$ +$ZrO_2$ +$SiO_2$ +$P_2O_5$) between 20 and 42%.

Advantageously, it is possible to embed in the glass matrix of the compound according to the invention substantial amounts of other trace elements, such as for example selenium (Se) and vanadium (V), as testing confirms their importance in plant and animal nutrition.

The compound according to the invention is obtained by mixing, according to the glass-making technique, the raw materials required to provide the forming and modifier oxides of the glass matrix with the raw materials related to the introduction of the trace elements, melting the resulting mixture at high temperature, cooling the molten mixture in order to obtain glass, and grinding the glass into a fine powder which is then mixed with a dispersant and optionally "granulated" so as to allow its mechanical spreading on fields.

The fertilizer compound is thus ready for use.

The aim of the present invention is to act on the nature of the glass matrix that acts as "carrier" of the trace elements, altering its solubility not only in water but also in the presence of organic acids (carbonic acid, citric acid, humic acid, et cetera), so that the application is always controlled over time and also contributes a high level of nutrients from the very start.

It is thus possible to produce mixtures constituted by different compounds having matrices with different solubilities and different presence of trace elements, so as to be able to program the release of these elements according to the stages of growth of the plant.

To program over time releases of different compositions, all derived from a single formula applied to the soil with a single application, it is in fact sufficient to apply to the soils a mixture constituted by glass matrices having different solubilities and different chemical analyses.

This would be impossible to achieve with conventional products except by resorting to different applications of different fertilizers, with a considerable cost increase.

On the basis of the compound according to the invention, special products have also been developed whose water solubilities are high enough to allow them to be absorbed on very moist soils, such as rice cultivations, up to aquatic plant cultivations and industrial productions of first fruits and vegetables by means of the hydroponic method.

Finally, attention is drawn to the fact that the compound according to the invention has considerably lower intrinsic costs than conventional types of compound.

The cost per kilogram, for an equal addition of nutrients, is considerably lower for these products than for conventional chelates: a quick calculation shows that if one considers that each chelate adds only one element, the amount to be used is evidently approximately 1 kg of compound against as much as 2.5–2.7 kg of chelates.

Since the corresponding unit costs are in an approximate ratio of 1:6 per kg of product in favor of the compound according to the invention, this leads to a ratio of approximately 1:13/1:15 in the overall cost of the treatment.

The following examples are provided merely as illustration of the present invention and must not be construed as limiting its scope as defined in the appended claims.

EXAMPLE 1

A first fertilizer compound having a glass matrix obtainable from a mixture of raw materials which add the following chemical elements, expressed as oxides:

| | |
|---|---|
| $SiO_2$ | 23% |
| $ZrO_2$ | / |
| $P_2O_5$ | 9.5% |
| $Al_2O_3$ | 8% |
| CaO | 9.5% |

-continued

| | |
|---|---|
| MgO | 1% |
| BaO | / |
| Na$_2$O | 2% |
| K$_2$O | 7% |
| Li$_2$O | / |
| B$_2$O$_3$ | 11.5% |
| Fe$_2$O$_3$ | 11% |
| ZnO | 8% |
| CuO | 2% |
| MoO | 0.5% |
| MnO | 7% |

EXAMPLE 2

A second fertilizer compound having a glass matrix obtainable from a mixture of raw materials which add the following chemical elements, expressed as oxides:

| | |
|---|---|
| SiO$_2$ | 5.5% |
| ZrO$_2$ | / |
| P$_2$O$_5$ | 19.5% |
| Al$_2$O$_3$ | 2% |
| CaO | 10% |
| MgO | 2% |
| BaO | / |
| Na$_2$O | 6.2% |
| K$_2$O | 11% |
| Li$_2$O | 0.8% |
| B$_2$O$_3$ | 15.5% |
| Fe$_2$O$_3$ | 9% |
| ZnO | 8% |
| CuO | 3% |
| MoO | 0.3% |
| MnO | 7.2% |

EXAMPLE 3

A third fertilizer compound having a glass matrix obtainable from a mixture of raw materials which add the following chemical elements, expressed as oxides:

| | |
|---|---|
| SiO$_2$ | 19% |
| ZrO$_2$ | 1% |
| P$_2$O$_5$ | 8% |
| Al$_2$O$_3$ | 3% |
| CaO | 10% |
| MgO | 1% |
| BaO | 0.8% |
| Na$_2$O | 2.4% |
| K$_2$O | 12% |
| Li$_2$O | / |
| B$_2$O$_3$ | 18% |
| Fe$_2$O$_3$ | 10% |
| ZnO | 6% |
| CuO | 1.5% |
| MoO | 0.3% |
| MnO | 6% |

The resulting fertilizer compounds have a water solubility between 14 and 20% and a solubility in diluted organic acids between 70 and 95%.

It is noted that in the description, in the above examples and in the cited formulas, the chemical elements are expressed as oxides according to the common practice of glass industry, while the trace elements, when listed without reference values, are specified conventionally by using their chemical symbol.

As regards the elements that do not belong to the trace element category, the indication of the value of 0.1% is to be understood as possible impurity of an industrial process, without practical effect on the agronomic characteristics of the product according to the invention.

The disclosures in Italian Patent Application No. MO99A000207 from which this application claims priority are incorporated herein by reference.

What is claimed is:

1. A fertilizer compound having a glass matrix comprising an association of forming oxides, modifier oxides and at least one inorganic microelement, wherein said forming oxides comprise between 9 and 22% by weight phosphorus pentoxide (P$_2$O$_5$), silicon dioxide and at least one of zirconium dioxide and titanium dioxide and said modifier oxides comprise potassium oxide (K$_2$O), and at least one of sodium oxide and lithium oxide.

2. The compound according to claim 1, wherein said microelement is selected from the group consisting of B, Fe, Mn, Zn, Cu, Mo, Co and mixtures thereof.

3. The compound according to claim 1, wherein said forming oxides further comprise Al$_2$O$_3$.

4. The compound according to claim 1, wherein said modifier oxides further comprise at least one of CaO, MgO and BaO.

5. The compound according to claim 1, wherein said microelement, expressed as an oxide thereof, is selected from the group consisting of B$_2$O$_3$, Fe$_2$O$_3$, MnO, ZnO, CuO, Mo$_2$O$_3$, CoO and mixtures thereof.

6. The compound according to claim 1, wherein said K$_2$O is present in amounts between 12.8 and 3% by weight.

7. The compound according to claim 1, wherein said microelement, expressed as an oxide thereof, is selected from the group consisting of B$_2$O$_3$, Fe$_2$O$_3$, MnO, ZnO, CuO, Mo$_2$O$_3$, CoO and is present in an amount of 45–19% by weight.

8. The compound according to claim 1, wherein said compound comprises an association of CaO, MgO, BaO in an amount of 29–6% by weight.

9. The compound according to claim 1, wherein said compound comprises an association of Na$_2$O, K$_2$O, Li$_2$O in an amount of 19–7% by weight.

10. The compound according to claim 1, wherein said compound comprises an association of TiO$_2$, ZrO$_2$, SiO$_2$, P$_2$O$_5$ in an amount of 20–42% by weight.

11. A method for obtaining a fertilizing compound having a glass matrix, comprising:
    mixing forming oxides, modifier oxides, and one or more microelements;
    melting the mixture;
    cooling said melted mixture to obtain a glass;
    granulating said glass; and
    grinding said glass to a fine powder,
    wherein said forming oxides comprise between 9 and 22% by weight phosphorus pentoxide (P$_2$O$_5$) and at least one of zirconium dioxide and titanium dioxide and one of said modifier oxides is potassium oxide (K$_2$O).

12. The method according to claim 11, wherein said forming oxides of said glass matrix are selected from the group consisting of SiO$_2$, Al$_2$O$_3$, TiO$_2$, ZrO$_2$ and mixtures thereof.

13. The method according to claim 11, wherein said modifier oxides are selected from the group consisting of Na$_2$O, Li$_2$O, CaO, MgO, BaO and mixtures thereof.

14. The method according to claim 11, wherein said trace elements are selected from the group consisting of B, Fe, Mn, Zn, Cu, Mo, Co and mixtures thereof.

15. The method according to claim 11, comprising a further step of mixing said compound with a fertilizer.

16. A fertilizing method comprising delivering a compound of claim 1 to a soil.

17. The compound according to claim 3, wherein $SiO_2$ is present in an amount of 0.1–26%, $Al_2O_3$ is present in an amount of 0.1–9%, $TiO_2$ is present in an amount of 0.1–3%, and $ZrO_2$ is present in an amount of 0.1–3.5%.

18. The compound according to claim 4, wherein $Na_2O$ is present in an amount of 8–1%, $Li_2O$ is present in an amount of 0.1–3%, CaO is present in an amount of 22–6%, MgO is present in an amount of 3–0.1% and BaO is present in an amount of 2.7–0.1%.

19. The compound according to claim 5, wherein $B_2O_3$ is present in an amount of 9–18%, $Fe_2O_3$ is present in an amount of 11–2%, MnO is present in an amount of 9–1%, ZnO is present in an amount of 8–2%, CuO is present in an amount of 4–0.1%, $Mo_2O_3$ is present in an amount of 0.5–0.1% and CoO is present in an amount of 0.5–0.1%.

* * * * *